June 14, 1932. J. KAUTZKY, JR 1,862,683
LEVEL WIND FISHING REEL
Filed Aug. 4, 1930
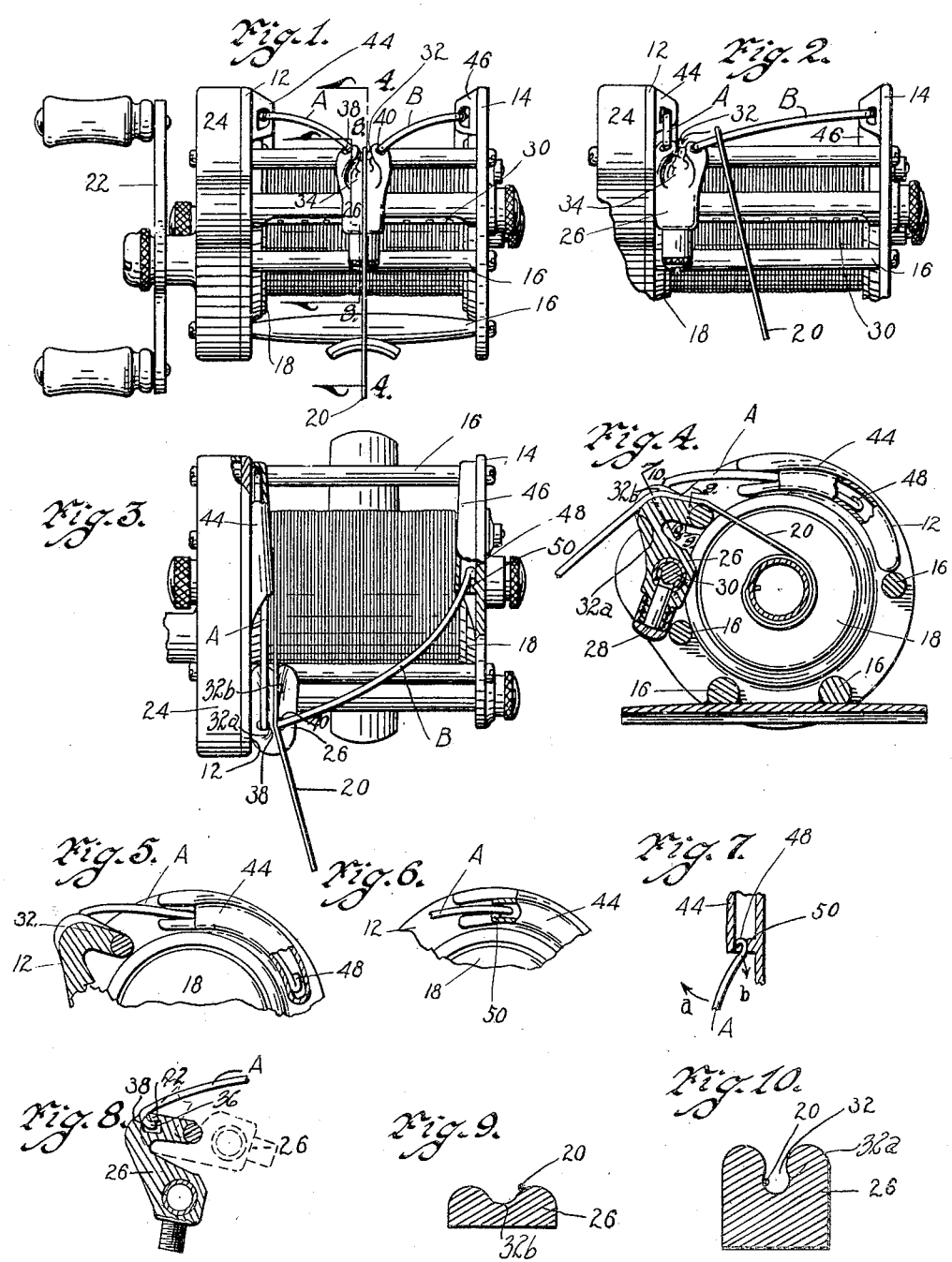

Patented June 14, 1932

1,862,683

UNITED STATES PATENT OFFICE

JOE KAUTZKY, JR., OF FORT DODGE, IOWA

LEVEL-WIND FISHING REEL

Application filed August 4, 1930. Serial No. 472,812.

The object of this invention is to provide improved level-winding mechanism especially adapted for free-spool fishing reels for the purpose of causing the fishing line to be properly laid upon the reel without piling up at any point during the winding-in operation.

A further object of the invention is to provide an improved traversing mechanism for a fishing reel including a line carriage formed with means for engaging a line and causing it to be uniformly laid upon the reel and also including a pair of curved guiding arms pivotally connected to the carriage and to opposite sides of the reel frame for guiding the line from any lateral point toward the carriage.

Still another object of the invention is to provide an improved level winding mechanism adapted for positively and immediately leading an unguided line, just following a cast and immediately preparatory to winding the line upon the spool, toward a notch formed in a traversing line carriage.

Another and further object of the invention is to provide a level winding mechanism in connection with a free-spool fishing reel so arranged as to enable the operator to make a cast with a free spool and with the line free from and unhampered in its outward movement by any contact with the level winding mechanism.

Another object of the invention is to provide an improved level winding mechanism including a carriage formed with a notch to receive the line and having guiding arms pivotally connected thereto and spanning at all times the variable space between the carriage and the opposite sides of the spool, said arms presenting in all of their positions a slope or decline toward the notch of the line carriage, whereby the line will always be caused to travel toward said notch upon initiation of the winding-in operation.

A further object of the invention is to provide a level winding mechanism for fishing reels which is simple and inexpensive as to construction and assembly of the parts, capable of being easily and quickly disassembled, and which is very efficient in use.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a front elevation of a free-spool level-wind fishing reel constructed in accordance with my invention, the line carriage being shown substantially at the center or intermediate point of its travel.

Figure 2 is a fragmentary front elevation showing the line carriage at one end of its travel, and illustrating how the fishing line is caused to move toward the notch of the carriage by engagement with one of the guiding arms.

Figure 3 is a plan view, partly in section, showing the parts in substantially the same position as in Figure 2, but with the line engaged in the notch of the carriage.

Figure 4 is a cross section on the line 4—4 of Figure 1.

Figure 5 is a sectional elevation showing the inner face of a portion of one of the reel heads, and illustrating particularly one of the curved guiding arms and the curved housing within which it is received when retracted.

Figure 6 is a similar view showing the guiding arm fully extended and the means for preventing the arm from becoming disengaged and entirely removed from its housing.

Figure 7 is a sectional view substantially at right angles to the showing in Figure 6, and illustrating how the guiding arm may be manually disengaged from its housing in the event it becomes necessary to remove it for repairs or the like.

Figure 8 is a longitudinal section through a portion of the line carriage taken on the line 8—8 of Figure 1, illustrating particularly the relative movement of the line carriage and one of the guiding arms for separating them for making repairs or like purposes.

Figure 9 is an enlarged cross section through the shallower portion of the line carriage taken on the line 9—9 of Figure 4, illustrating how the line may move out of the notch when a cast is made.

Figure 10 is an enlarged section through the line carriage at that portion which is formed with a deep undercut notch for retaining the line during the winding-in operation, as taken on the line 10—10 of Figure 4.

The fishing reel to which my level wind improvements are applied may be of any approved type and construction. The reel, as here shown, includes a skeleton cylindrical frame composed primarily of spaced discs or head plates 12 and 14 connected by a series of cross bars 16 circumferentially spaced. A spool 18 is suitably journaled for rotation within the skeleton frame and is adapted to receive a fishing line 20. A hand crank 22 is arranged for rotation adjacent the head plate 12 and suitable clutch connections, not shown, are mounted within a cylindrical casing 24 carried by the head plate 12, whereby the spool 18 is rotated rearwardly when the crank is turned forwardly, in a common manner.

The clutch connections within the casing 24 are preferably of the "free-spool" type to permit the spool to rotate freely and permit the line 20 to pay out without drag and without causing the movement of any parts other than the rotation of the spool in its journal bearings. This permits free and untrammeled outward movement of the line in making a cast, as is well known.

The free-spool clutch mechanism forms no part of my present invention, but it may be of the kind illustrated and described in my co-pending application, filed August 4, 1930, Serial Number 472,811. The reel also includes other members which have no particular bearing on the present invention, and which need not be referred to in detail.

A line carriage, designated by the numeral 26, is arranged for back and forth or traversing movement at the forward side of the skeleton frame and between the head plates 12 and 14. The carriage 26 is arranged for sliding movement upon or against some of the cross bars 16 and is provided with a pawl 28 which engages a spirally grooved carriage shaft 30. The shaft 30 is arranged for rotation at the forward part of the cylindrical frame and is rotated by suitable mechanism when the hand crank 22 is turned for winding in the line 20 upon the spool 18. The engagement of the pawl 28 with the grooved shaft 30 causes the carriage 26 to move continuously back and forth between the head plates 12 and 14 in a manner that is already common and well known.

My present improvement relates particularly to the construction of the line carriage 26, its means for engaging the line, and guiding arms for constantly spanning the variable space between the carriage and the respective head plates.

A fish line in being paid off of a level wound reel as during a cast naturally plays back and forth. With the line carriage notch heretofore used this playing back and forth of the fish line when unreeling would be sure to catch. This tends to cross thread the unreeling line which, of course, is a serious detriment to the cast.

To prevent this I have provided a long trough-like notch 32 in the carriage 26, which is of angular formation when viewed from the side, as indicated in Figures 4, 5 and 8, and the notch extends over the angular part of the carriage. The central part of the notch 32 as indicated at 32a is comparatively deep and may be somewhat undercut as best shown in Figure 10. The rear end of the notch 32 as indicated at 32b is comparatively shallow as shown best in Figure 9. By referring to the section lines 9—9 and 10—10 on Figure 4 it will be readily seen just where the shallow and deep parts of the notch 32 are with respect to the carriage 26. The front part of the notch, as shown in Figures 1 and 2 and designated 34, widens out considerably to substantially fan shape and gradually decreases in depth along the front face of the carriage, as best shown in Figure 5. This front part of the notch may be slightly undercut.

The specific shape of the notch as shown and just described allows the line 20 when played back and forth in unspooling to easily slide up and out of the notch because of the shape at the portion 32b. This avoids all interference of the notch with the cast.

The deep central part 32a on the other hand is for the purpose of preventing the operator, while reeling in, from possibly pushing the incoming line from the notch and hence from the carriage 26 which is provided for winding the line level. Ordinarily the operator would not do this but it can accidentally happen if the deep and undercut part of the notch is not so formed. The wide undercut face portion of the notch also assists in this function.

The change from the deep portion 32a of the notch to the portion 32b as well as to the wide face portion, is somewhat gradual as can be readily seen in Figure 5. It will also be observed from Figure 3 that the notch 32 is enlarged in width from the portion 32a to the portion 32b and that the surfaces of the carriage 26 adjacent the top are smooth and rounder so that there is no chance for the line 20 to catch or become entangled in its movement in either direction relative to the carriage. The deep portion 32a of the notch will allow the line 20 to pass therethrough in more or less angular fashion without any possibility of the line jumping out of the notch during reeling-in operations. It will also be understood that traversing or back and forth movement of the carriage 26 with the line 20 engaged in the notch 32 during the reeling-in operation will cause the line to be wound in even or level windings on the spool, or in other words will prevent piling up of the line at any one point.

In order to insure that the line will immediately assume its proper position in the notch 32 of the carriage when the winding-in operation is commenced, I have provided a pair of guiding arms A and B which are movably connected with the carriage and with the respective head plates 12 and 14 to bridge the variable spaces therebetween. These guiding arms are so arranged that they will cause the line when it contacts with either of them to travel immediately toward the notch of the carriage.

The guiding arms A and B are identical in construction, but they are arranged oppositely when assembled.

Each of the guiding arms is curved or formed on a suitable arc and each is formed at its forward end and on its convex side with a hook 36. The carriage 26 is formed with a pair of openings 38 and 40 located on opposite sides of the line notch 32 and each of these openings is designed to receive the hook 36 of one of the guide arms. The material of the carriage 26 is relatively thin at this point as shown in Figure 8 to permit engagement of the hooks 36 and the upper rear part of the carriage terminates in a downwardly hooked portion 42 back of each of the openings 38 and 40.

By this arrangement I have provided a simple means for accomplishing a pivotal connection of the guiding arms A and B with the line carriage without the use of screws, pins or the like. This connection permits free relative movement of the carriage and guiding arms and the interengagement of the hooked parts 36 and 42 prevents disengagement of the arms from the carriage so long as the carriage is assembled to the reel frame. The parts can only be disengaged by detaching the carriage from the frame and causing a relative movement of the carriage and arm in the manner indicated by dotted lines in Figure 8 whereby the hooked part 36 may be removed and the arm detached from the carriage.

On the inner upper faces of the respective head plates 12 and 14 of the frame, I have provided arcuate housings designated respectively by the numerals 44 and 46. The guiding arms A and B are engaged at their outer ends respectively with the housings 44 and 46 and are adapted to be retracted or withdrawn therein alternately and successively as the carriage moves back and forth between the head plates.

Each housing 44 and 46 is curved on an arc corresponding to the curvature of the arm A or B and is also open at its forward end to receive said arm.

Each arm A and B is formed at its outer end with a hook 48 on its convex side, and the hook 48 is adapted to engage with a shoulder or stud 50 projecting laterally at the entrance to either of the housings 44 or 46.

Normally the restriction of the opening caused by the shoulder or stud 50 prevents the complete withdrawal of the guiding arm because of the enlarged part on said arm caused by the hook 48. However, when the line carriage has been removed from its position as previously indicated in connection with Figure 8, the arm may be disengaged from the housing 44 or 46 by swinging it laterally in the direction of the arrow $a$ in Figure 7, and withdrawing it forwardly in the direction of the arrow $b$, thus causing the hook 48 to pass by the shoulder or stud 50.

In this way either or both of the arms A and B may be removed for repairs or replacement of parts, if such operation should become necessary.

The curvature and position of the guiding arms A and B presents at all times a slope or decline from points near the respective head plates 12 and 14 toward the notch 32 of the line carriage, irrespective of the position of the carriage between the head plates. The guiding arms serve to bridge the spaces between the carriage and the respective head plates and whenever the line 20 falls upon either of these arms when the winding-in operation is commenced, the slope or decline before referred to will immediately cause the line to travel down such arm toward the carriage and be received in the notch. This sliding of the line is caused by the natural tendency of an object to seek the lowest level, particularly when under pressure, and it will be understood that there is some pressure or drag on the line at this time because the line immediately tightens slightly when the reeling-in is commenced.

As the carriage 26 moves back and forth in its normal travel, the guiding arms A and B will be alternately and successively withdrawn or retracted, from their respective housings 44 and 46 on the one hand, and extended at substantially full length on the other hand. In Figure 1, I have shown the carriage in substantially central position wherein each of the arms A and B is withdrawn approximately one-half its extent from its housing. In Figures 2 and 3, I have shown the carriage at one end of its travel and in contact with the head plate 12 so that the arm A is retracted to the fullest extent in the housing 44 and lies in a position substantially parallel with the plate 12, while the other arm B is withdrawn to the fullest extent and extends nearly across the face of the spool.

In Figure 2, I have illustrated an instance where the line 20 has engaged the extended guiding arm B and is traveling or about to travel toward the notch of the line carriage, and in Figure 3 I have shown the consummation of this operation, the line having become engaged in the notch 32 so that it will be caused to travel with the carriage and be properly wound upon the spool.

The deep, narrow portion 32a of the notch, together with the undercut formation of the portion 34 at the forward end and on the face of the line carriage 26, tends to retain the line in the notch and to prevent the operator from accidentally pushing it out of the notch while handling fish, or otherwise manipulating the device.

The tapered and rounded portion 32b of the rear end of the notch 32 allows the line to easily slide out of the notch in making a cast, or when the line is being paid out, thus avoiding any undesirable interference with the casting operation. The shape of the notch at 32b also prevents any catching of the line in the act of casting.

In all positions of the line carriage 26 the guiding arms A and B are so arranged as to bridge the variable space between the carriage and the ends of the frame so that a line falling upon either of said arms will, because of the sloping or declining shape of the arms, tend to immediately travel toward the notch 32 and become engaged therein so that the level winding function begins immediately upon starting the winding-in operation.

The arms A and B may be readily formed of short pieces of wire or light steel or other metal rod and, as before stated, they are capable of being very easily and quickly assembled and placed in position without the use of tools or extraneous securing devices.

It will, therefore, be obvious that I have designed a level winding mechanism which is inexpensive to make and very easily assembled and which is highly efficient in use.

I claim as my invention:—

1. In a fishing reel having a frame and a spool rotatably mounted therein to receive a line, a level-wind mechanism comprising a line carriage arranged for reciprocation in front of said spool, said carriage being formed with a line-receiving notch, and arms pivotally connected to said carriage and movably engaging opposite sides of the frame, each arm sloping toward the notch of said carriage for guiding the line thereto.

2. In a fishing reel having a frame and a spool rotatably mounted therein to receive a line, a level-wind mechanism comprising a line carriage arranged for reciprocation in front of said spool, said carriage being formed with a line-receiving notch, and a pair of arms spanning the variable spaces between said carriage and the respective ends of the frame, said arms sloping toward the notch of said carriage for causing an unguided line to move thereto when tension is applied for reeling in the line.

3. In a fishing reel having a frame and a spool rotatably mounted therein to receive a line, a level-wind mechanism comprising a line carriage arranged for reciprocation in front of said spool, said carriage being formed with a line-receiving notch, and an arm having a hooked pivotal connection at one end with said carriage adjacent said notch, and having a slidable connection at the other end with one end of the frame, said arm serving to guide a line toward said notch.

4. In a fishing reel having a frame and a spool rotatably mounted therein to receive a line, a level-wind mechanism comprising a line carriage arranged for reciprocation in front of said spool, said carriage being formed with a line-receiving notch, a curved arm pivotally connected at one end to the carriage adjacent said notch, and a housing at one end of the frame formed with a restricted opening into which said arm may be slidably retracted as the carriage travels in that direction.

5. In a fishing reel having a frame and a spool rotatably mounted therein to receive a line, a level-wind mechanism comprising a line carriage arranged for reciprocation in front of said spool, said carriage being formed with a line-receiving notch, a curved arm pivotally connected at one end to the carriage adjacent said notch, and a housing at one end of the frame formed with a restricted opening into which said arm may be slidably retracted as the carriage travels in that direction, said arm being formed with a hook at its outer end, said housing being formed with a part to be engaged by said hook to normally prevent accidental removal of the arm therefrom.

Des Moines, Iowa, July 2, 1930.

JOE KAUTZKY, Jr.